United States Patent [19]

van der Sluys et al.

[11] Patent Number: 4,548,129
[45] Date of Patent: Oct. 22, 1985

[54] COFFEE MAKER

[75] Inventors: Willem L. N. van der Sluys; Jacobus Pastoor; Johannes C. M. Roelofs, all of Eindhoven, Netherlands

[73] Assignee: U.S. Philips Corporation, New York, N.Y.

[21] Appl. No.: 657,290

[22] Filed: Oct. 3, 1984

[30] Foreign Application Priority Data

Oct. 6, 1983 [NL] Netherlands .......................... 8303421

[51] Int. Cl.⁴ .............................................. A47J 31/00
[52] U.S. Cl. ...................................... 99/281; 99/282; 99/283; 99/295; 99/307
[58] Field of Search ................. 99/295, 280, 281, 282, 99/283, 299, 300, 304, 305, 307; 426/433

[56] References Cited
U.S. PATENT DOCUMENTS 3,596,588  8/1971  Moss ...................................... 99/295
4,083,295  4/1978  Hollingsworth ...................... 99/295
4,147,097  4/1979  Gregg .................................... 99/283
4,169,978  10/1979 Hauslein ............................... 99/281
4,224,503  9/1980  Gijzel .................................... 99/281
4,328,106  5/1982  Harrar .................................. 210/700

Primary Examiner—Robert W. Jenkins
Attorney, Agent, or Firm—Rolf E. Schneider

[57] ABSTRACT

The invention relates to a coffee maker comprising a water reservoir (1), a filter device (2) and a flow heater (3) for heating water from the water reservoir for delivery to the filter device. A problem associated with coffee makers is the deposit of scale in the flow heater. It is proposed to provide a coffee maker with means (13, 14) for adding a small amount of coffee extract to the water before it enters the flow heater (3). Coffee extract naturally contains phosphoric-acid-like compounds which inhibit the crystal growth of metal salts in the water. Preferably, coffee extract is fed continuously from the filter device (2) to the water reservoir (1).

7 Claims, 5 Drawing Figures

COFFEE MAKER

The invention relates to a coffee maker comprising a water reservoir, a filter device and a flow heater for heating water from the water reservoir for delivery to the filter device.

Such coffee makers are generally known. A common problem associated with coffee makers is the deposit of scale in the flow heater, more particularly on the wall of the water duct of the flow heater. This necessitates rinsing with a solution of acetic acid at regular intervals. Especially in areas with very hard water, where the scale formed contains much calcium sulphate, the water duct may become clogged completely despite frequent rinsing with a solution of acetic acid.

It is the object of the invention to provide a coffee maker in which the deposit of scale in the flow heater is reduced substantially. According to the invention the coffee maker is characterized in that means are provided for adding a small amount of coffee extract to the water before it flows into the flow heater.

It has been found that by adding a small amount of coffee extract the deposit of scale in the flow heater is reduced substantially. Further investigations have revealed that coffee beans naturally contain phosphoric-acid-like compounds. These phosphoric-acid-like compounds have the property of delaying the growth of metal-salt crystals in the water and thereby reducing the deposit of scale (see U.S. Pat. No. 4,328,106). From GB No. 2,089,780 it is known to provide the water reservoir of a coffee maker with a separate cartridge with a permeable wall. The cartridge contains polyphosphate crystals, which inhibit the deposit of scale from the water.

As the crystal-growth inhibiting property is effective only for a fairly short time, the addition of coffee extract to the water during the coffee-making process must be effected gradually. Preferably, during coffee making, a small amount of coffee extract is fed continuously from the filter device to the water upstream of the point where it enters the flow heater.

An embodiment of the coffee maker is characterized in that the means comprise connecting pipes between the filter device and the water reservoir. It is desirable that the crystal-growth inhibiting substances are applied to the flow heater as soon as possible after the beginning of the coffee making process. In order to achieve this, a connecting pipe with a small internal diameter is used and the connecting pipe terminates close to the outlet opening of the reservoir.

A further embodiment is characterized in that there is provided a water-level indicator, which switches off the heating element of the flow heater when the pressure in the pipe between the water reservoir and the flow heater has fallen below a specific value, so that residual water remains in the flow heater. Surprisingly it has been found that the combination of adding a small amount of coffee extract to the water before it reaches the flow heater and leaving residual water in the flow heater, i.e. not evaporating the water at the end of the coffee-making process, substantially reduces the deposit of scale on the wall of the water duct of the flow heater. Tests have revealed that by adding coffee extract the limit at which the water duct becomes clogged is raised by a factor of 2 to 3, whilst in combination with not evaporating residual water in the water duct this clogging limit is raised by a factor of at least 10. It is to be noted that leaving the residual water in the flow heater is known per se from U.S. Pat. No. 3,759,161.

Instead of the aforementioned combination it is possible to combine the addition of a smaller amount of coffee extract with a construction which is characterized in that a separate evaporation chamber is provided for evaporating residual water and control means are provided for feeding all the residual water to the evaporation chamber. This combination yields the same advantages as the afore-mentioned combination. Preferably, the control means comprise a branch pipe, of which one end is connected to the evaporation chamber and of which the other end is connected to the pipe between the water reservoir and the flow heater, a valve in the branch pipe and a water-level indicator which causes the valve to open when the pressure in the pipe between the water reservoir and the branch pipe has fallen below a specific value, so that all the residual water flows to the evaporation chamber. The evaporation chamber may be heated by the heating element of the flow heater.

Some embodiments of the invention will now be described in more detail, by way of example, with reference to the schematic drawings.

Figure 1:
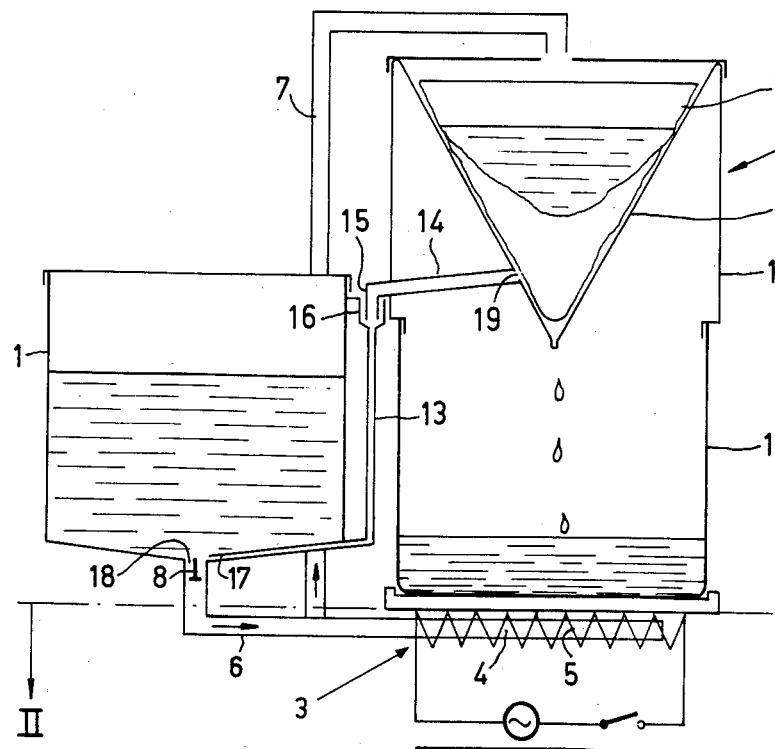
FIG. 1 shows a coffee maker in which a small amount of coffee extract is fed from the filter device to the water reservoir.
Figure 2:
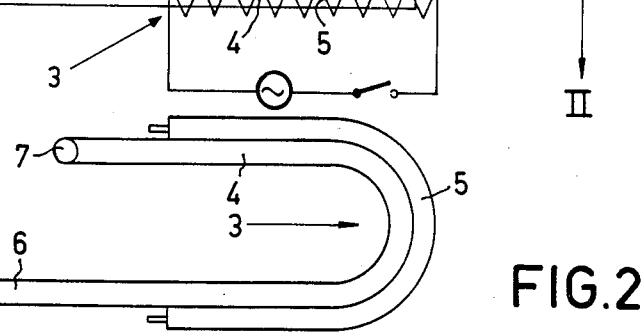
FIG. 2 is a sectional view taken on the line II—II in FIG. 1.

The coffee maker comprises a water reservoir 1, a filter device 2, a flow heater 3, which comprises a water duct 4 and a heating element 5 in thermal contact therewith, a pipe 6 between the water reservoir and the water duct of the flow heater, and a riser pipe 7, which is connected to the end of the water duct and which discharges above the filter device 2. Cold water flows from the water reservoir to the flow heater, where it is heated, after which it is supplied to the filter device via the riser pipe. In the pipe 6 a non-return valve 8 is arranged. The filter device comprises a tapered filter holder 9 surrounded by a cylindrical housing 10. A tapered filter bag 11 for the ground coffee beans can be placed in the holder 9. The cylindrical housing can be placed on the rim of a receptacle 12.

In accordance with the invention the coffee maker is provided with means for supplying a small amount of coffee extract to the water before it reaches the flow heater 3. In the present example the means comprise connecting pipes 13, 14 between the filter device 2 and the water reservoir 1. The connecting pipe 13 has a small internal diameter, and it extends upwardly from the lower side of the reservoir, where it is rigidly connected to the reservoir. The connecting pipe 14 extends from an opening 19 in the wall of the filter holder 9 through the wall of the cylindrical housing, where it projects from the filter device. When the filter device is placed on the receptacle 12, this must be done in such a manner that the end 15 of the connecting pipe 14 terminates above or in the upper end portion 16 of the pipe 13. For this purpose the end portion 16 is widened. The lower end 17 of the pipe 13 opens into the water reservoir near the outlet opening 18. The opening 19 in the wall of the filter holder 9 is so dimensioned that during the coffee-making process only a small amount of coffee extract flows into the water reservoir. Satisfactory results have been obtained with a feedback of approximately 1% of the coffee brew.

It will be evident that the connecting pipes may also extend from the filter device to the pipe 6. The connection to the pipe 6 must then be situated upstream of the non-return valve 8.

Figure 3:
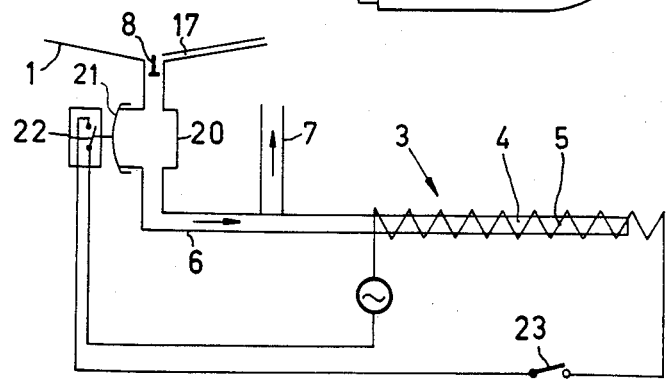
FIG. 3 shows a modification of the embodiment shown in FIG. 1 in which residual water remains in the flow heater after the coffee-making process.

FIG. 3 illustrates the situation in which not only is a small amount of coffee extract fed into the water reservoir but also residual water remains in the flow heater after the coffee-making process. The feeding of the coffee extract into the water reservoir is effected in the same way as described with reference to FIG. 1 and is therefore not shown. Identical parts bear the same reference numerals as in FIG. 1. In the pipe 6 a pressure-sensitive water-level indicator 20 is arranged. When the water reservoir 1 contains enough water the pressure in the pipe 6 will be such that the switch 22, which is actuated by a diaphragm 21, is closed. The switch 22 is arranged in an electric circuit of the heating element 5. This circuit also includes the on/off switch 23. The indicator 20 is adjusted so that when the water pressure falls below a specific value the switch 22 is opened and the heating element is switched off. The residual water in the appliance then remains in the pipe 6 and the water duct 4 of the flow heater. This water is not evaporated, thereby precluding unnecessary scale deposit. As already stated, this combination substantially prolongs the life of the flow heater and consequently that of the coffee-maker.

Figure 4:
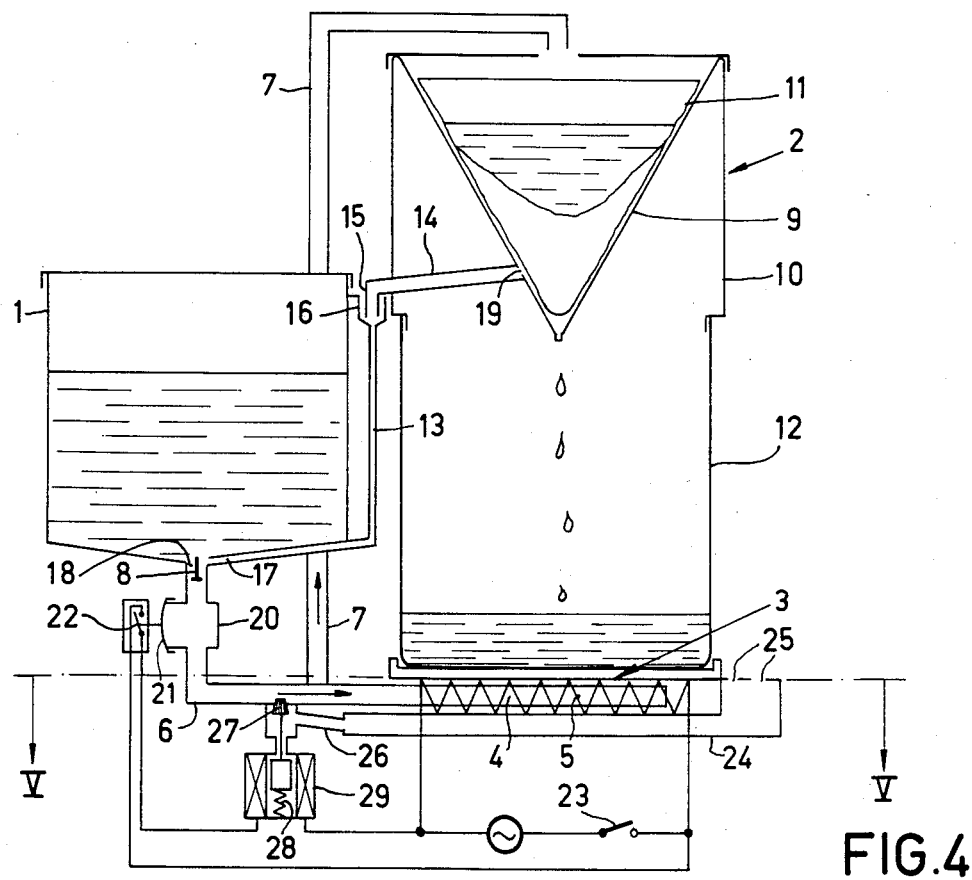
FIG. 4 shows another modification of the coffee maker shown in FIG. 1, in which the residual water is evaporated in a separate chamber.
Figure 5:
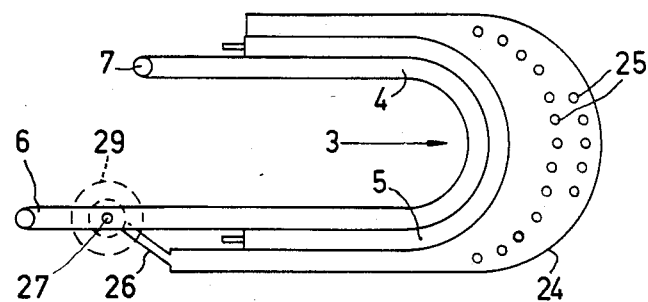
FIG. 5 is a sectional view taken on the line V—V in FIG. 4.

FIGS. 4 and 5 also show a combination of feeding coffee extract into the water reservoir and not evaporating water in the flow heater. However, the residual water does not remain in the flow heater, as in the example shown in FIG. 3, but is evaporated in a separate chamber. Identical parts bear the same reference numerals as in FIGS. 1 and 3. For evaporating the residual water there is provided a separate evaporation chamber 24 with apertures 25. The evaporation chamber is also heated by the heating element 5. However, it is alternatively possible to employ a separate heating element. The control means for feeding the residual water to the evaporation chamber comprise a branch pipe 26, which constitutes the connection between the pipe 6 and the evaporation chamber 24, a valve 27 in the inlet opening of the branch pipe and a water-level indicator 20 in the pipe 6. The valve 27 can close or open the branch pipe 26. By means of a spring 28 and an electromagnet 29, respectively, the valve 27 can be actuated so as to close or open the branch pipe. The coils of the electromagnet and the switch 22 of the level indicator 20 are included in an electric circuit which is arranged in parallel with the circuit of the heating element 5. During the coffee-making process and when the water pressure in the pipe 6 is sufficiently high, the switch 22 is open and the coils of the electromagnet are not energized, so that the spring 28 urges the valve 27 upwards to keep the branch pipe 26 closed. If the water level in the reservoir drops so far that the pressure in the pipe 6 falls below a specific value, the switch 22 is closed and the electromagnet is energized. As a result of this the valve 27 is pulled downwards to open the branch pipe 26 and allow the residual water to flow into the evaporation chamber 24. It is obvious that the heating element 5 remains switched on as long as the switch 23 is closed. The residual water is now evaporated in the evaporation chamber, so that scale is deposited at this location only. The evaporation chamber is so large that it need not be de-scaled. When this construction is used the residual water in the water duct of the flow heater is not evaporated at the end of the coffee-making process, which in particular in combination with the feeding of coffee extract to the water before it has reached the flow heater prolongs the life of the coffee maker.

What is claimed is:

1. A coffee maker comprising a water reservoir, a filter device and a flow heater for heating water from the water reservoir for delivery to the filter device, characterized in that means are provided for adding a small amount of coffee extract to the water before it flows into the flow heater.

2. A coffee maker as claimed in claim 1, characterized in that said means add a small amount of coffee extract from the filter device to the water before the water reaches the flow heater.

3. A coffee maker as claimed in claim 2, characterized in that said means comprise connecting pipes between the filter device and the water reservoir.

4. A coffee maker as claimed in claim 1, characterized in that there is provided a water-level indicator which switches off the heating element of the flow heater when the pressure in the pipe between the water reservoir and the flow heater has fallen below a specific value, so that residual water remains in the flow heater.

5. A coffee maker as claimed in claim 1, characterized in that a separate evaporation chamber is provided for evaporating residual water and control means are provided for feeding all the residual water to the evaporation chamber.

6. A coffee maker as claimed in claim 5, characterized in that said control means comprise a branch pipe, of which one end is connected to the evaporation chamber and of which the other end is connected to the pipe between the water reservoir and the flow heater, a valve in the branch pipe, and a water-level indicator which causes the valve to open when the pressure in the pipe between the water reservoir and the branch pipe has fallen below a specific value, so that all the residual water flows to the evaporation chamber.

7. A coffee maker as claimed in claims 5, characterized in that the evaporation chamber is heated by the heating element of the flow heater.

* * * * *